(12) United States Patent
Tsai et al.

(10) Patent No.: US 7,927,553 B2
(45) Date of Patent: Apr. 19, 2011

(54) PHOTOCATALYTIC REACTOR WITH MOVABLE CONFORMAL LIGHT GUIDING PLATE

(76) Inventors: Din-Ping Tsai, Taipei (TW); Jeffrey Chi-Sheng Wu, Taipei (TW); Nae-Lih Wu, Taipei (TW); Hung-Ji Huang, Taipei (TW); Tai-Chi Chu, Taipei (TW)

( * ) Notice: Subject to any disclaimer, the term of this patent is extended or adjusted under 35 U.S.C. 154(b) by 977 days.

(21) Appl. No.: 11/763,946

(22) Filed: Jun. 15, 2007

(65) Prior Publication Data
US 2008/0311011 A1 Dec. 18, 2008

(51) Int. Cl.
*B01J 19/08* (2006.01)
(52) U.S. Cl. .................................................. 422/186.3
(58) Field of Classification Search ................ 422/186.3
See application file for complete search history.

(56) References Cited

U.S. PATENT DOCUMENTS

| | | |
|---|---|---|
| 5,308,458 A | 5/1994 | Urwin et al. |
| 5,480,524 A | 1/1996 | Oeste |
| 5,689,798 A | 11/1997 | Oeste |
| 5,753,992 A * | 5/1998 | Avitable et al. ............... 310/239 |
| 5,875,384 A | 2/1999 | Peill et al. |
| 5,919,422 A | 7/1999 | Yamanaka et al. |
| 6,238,630 B1 | 5/2001 | Iimura |
| 6,309,081 B1 * | 10/2001 | Furihata ...................... 362/634 |

FOREIGN PATENT DOCUMENTS
WO    WO 03/037504 A1 *    5/2003
* cited by examiner

*Primary Examiner* — Kishor Mayekar
(74) *Attorney, Agent, or Firm* — WPAT, P.C.; Anthony King

(57) ABSTRACT

A photocatalytic reactor is disclosed herein, which includes a rotatable light guide plate and a light source. The light guide plate is coated with a photocatalyst film on a surface thereof. A light beam emitted from the light source can be coupled into and propagate inside the light guide plate to activate the photocatalysis of the photocatalyst film. Additionally, the rotation of the light guide plate further expedites the photocatalysis so as to enhance the reaction efficiency of the photocatalytic reactor.

13 Claims, 8 Drawing Sheets

PHOTOCATALYTIC REACTOR WITH MOVABLE CONFORMAL LIGHT GUIDING PLATE

BACKGROUND OF THE INVENTION

1. Field of the Invention

The present invention relates to a photocatalytic reactor with a light guide plate, in which the light guide plate can be rotated for guiding the propagation of an incident light so as to enhance the photocatalysis efficiency of the photocatalytic reactor.

2. The Prior Arts

In recent years, carbon dioxide emission has been increasing that makes the greenhouse effect more serious. To effectively improve this problem, many experts did many studies on how to use titanium dioxide ($TiO_2$), silicon carbide (SiC), and gallium phosphide (GaP) to convert carbon dioxide by photocatalysis into formaldehyde (HCHO) and methanol ($CH_3OH$). In the photocatalytic reduction reaction, the photocatalyst particles are uniformly mixed in a reactant solution to enhance the photocatalysis efficiency. Although such a way has a merit of increasing the photocatalysis efficiency, it is difficult to recover the photocatalyst from the reactant solution. And the treatment time of cost is relatively high. Additionally, another issue is how to increase exposure area of the photocatalyst to efficiently activate the photocatalysis. According to prior experimental results, $TiO_2$ has a low light transmittance. Ultraviolet light can penetrate through $TiO_2$ solution only 1 to 2 centimeter. Therefore, the photocatalysis of the deeper portion of $TiO_2$ solution can not be activated. In 1977, an optical fiber photocatalytic reactor has been proposed, in which the optical fiber is coated with $TiO_2$ on a surface thereof. A reactant is guided to contact with $TiO_2$ film, and a light beam is coupled into and propagates inside the optical fiber; thereby activating the photocatalytic reduction reaction with carbon dioxide. For example, U.S. Pat. Nos. 5,875,384, 5,919,422, and 6,238,630 disclosed a light guide photocatalytic reactor, respectively. These patents employed an LED or other light sources as a reaction light source to activate the photocatalysis; thereby having a small reaction cavity and good photocatalysis efficiency. However, the photocatalytic reactor should be installed inside the reaction cavity. Thus, the mass transfer efficiency of the reactant is relatively lower.

For another examples, U.S. Pat. Nos. 5,480,524, 5,308,458, and 5,689,798 disclosed a rotatable reactor, respectively, which can increase the mass transfer efficiency and the photocatalysis efficiency of the reactant by a centrifugal force. Since the light source is disposed outside the reactor, if the reactant has a low light transmittance, that will reduce the photocatalysis efficiency.

Thus, it is desired to provide a new photocatalytic reactor that can overcome the above shortcomings.

SUMMARY OF THE INVENTION

A primary objective of the present invention is to provide a photocatalytic reactor, which can solve the problems of bad mass transfer efficiency of the reactant in the prior light guide photocatalytic reactor and bad photocatalysis efficiency of the reactant in the prior rotatable reactor due to low light transmittance of the reactant.

To achieve the above objective, a photocatalytic reactor in accordance with the present invention includes a rotational light guide plate used as a reactor and to propagate an incident light inside the light guide plate, so as to effectively activate the photocatalysis of a photocatalyst film coated on a surface of the light guide plate. Additionally, in order to achieving more photocatalysis reaction, the photocatalytic reactor in accordance with the present invention further includes a plurality of light guide plates constructed as a reaction system.

BRIEF DESCRIPTION OF THE DRAWINGS

The present invention can be more fully understood by reading the following detailed description of the preferred embodiments, with reference to the accompanying drawings, in which.

DETAILED DESCRIPTION OF THE PREFERRED EMBODIMENTS

Figure 1A:
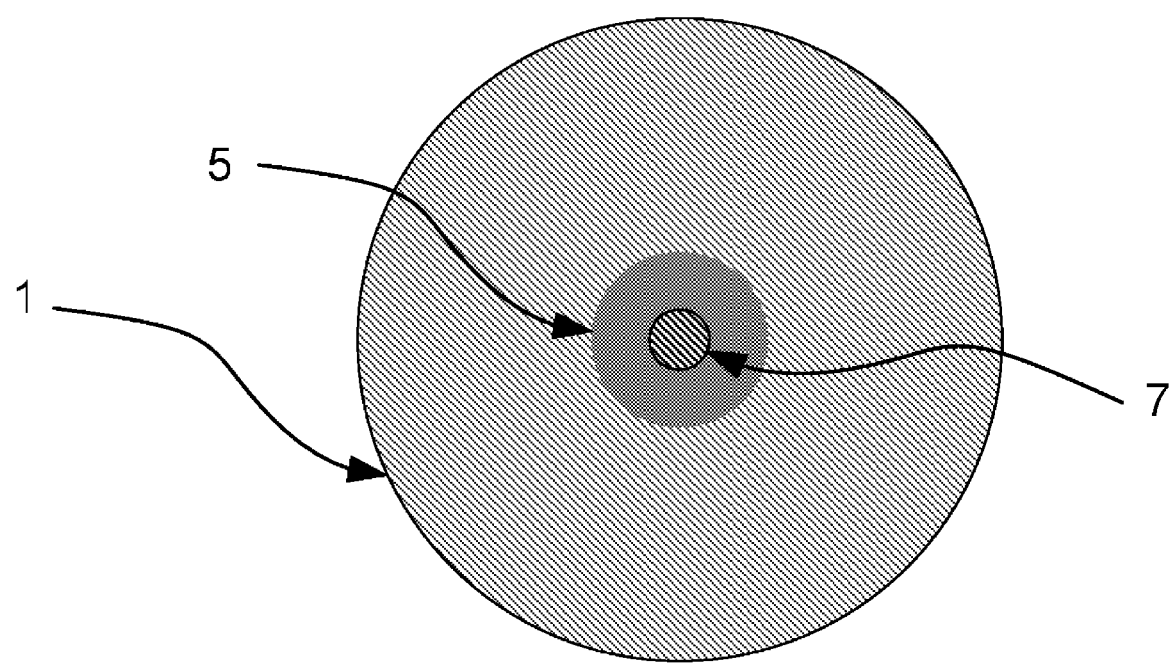
FIG. 1A is a top view of a photocatalytic reactor with a light guide plate according to the present invention.
Figure 1B:
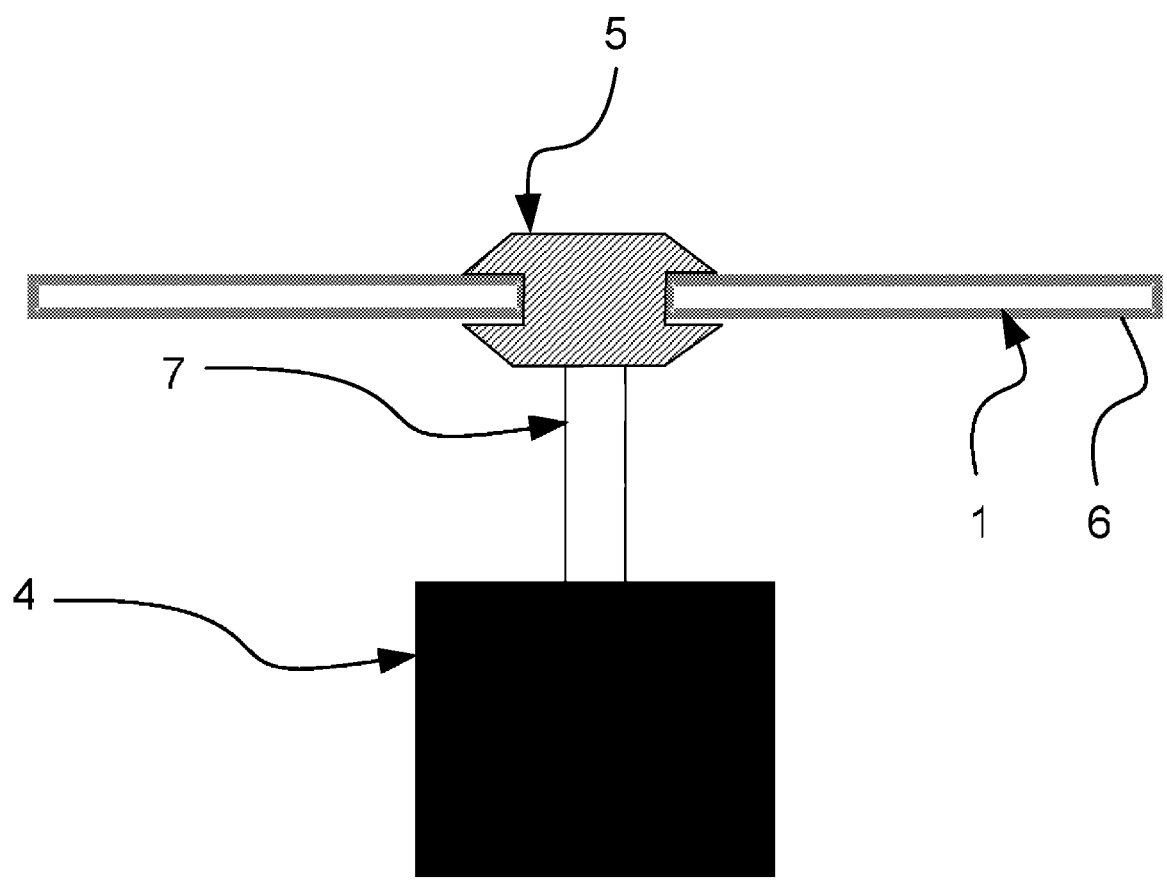
FIG. 1B is a sectional view of the photocatalytic reactor according to the present invention.
Figure 2:
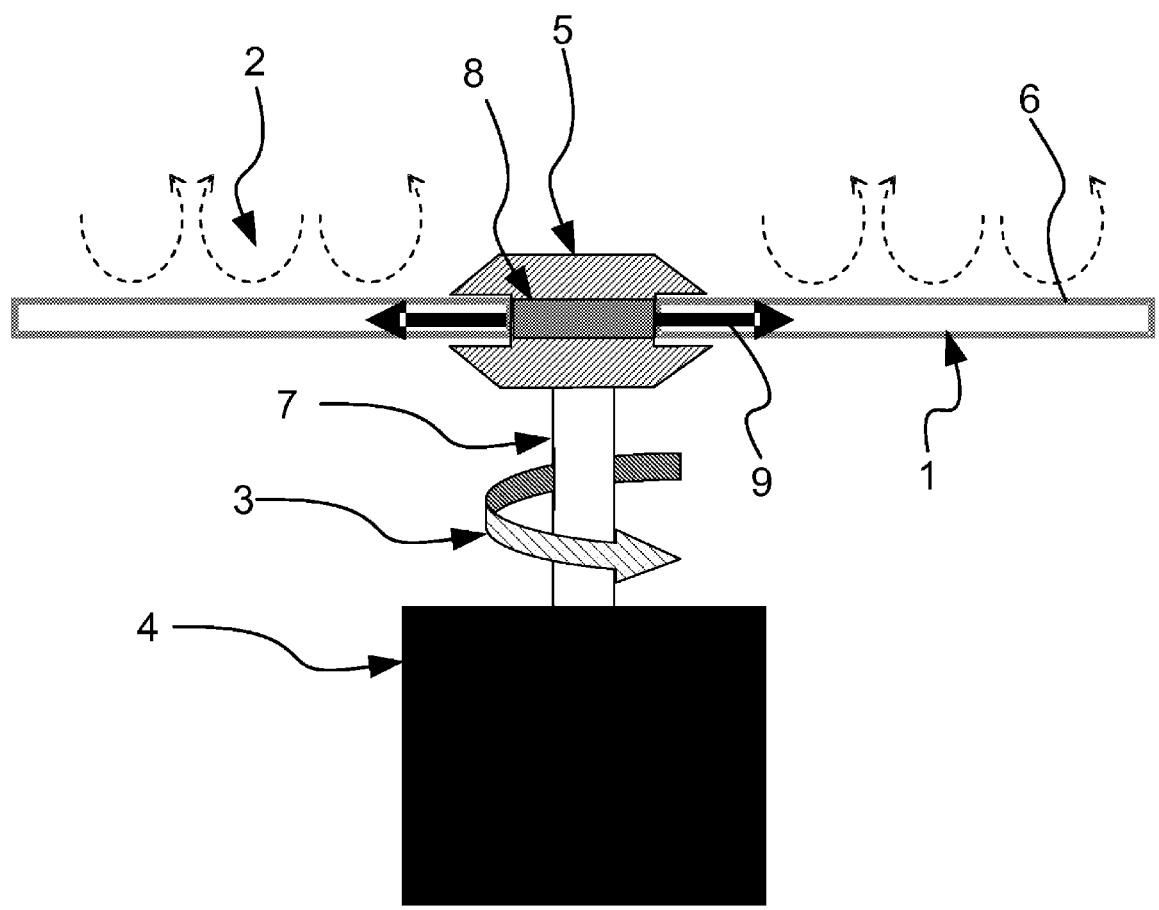
FIG. 2 is a schematic view showing the light coupling of the photocatalytic reactor according to a first embodiment of the present invention, in which the light source is disposed at a center of the light guide plate.

Referring to FIG. 1A, FIG. 1B, and FIG. 2, a photocatalytic reactor with a light guide plate in accordance with a first embodiment of the present invention comprises a light guide plate 1, a power device 4, a grip mechanism 5, and a first light source 8. The light guide plate 1 is a plate structure, which has a characteristic of light guide, coated with a photocatalyst film 6 on a surface thereof. The light guide plate 1 is constructed as a disk structure so as to have a stable rotation, and has a groove structure on a surface thereof for improving the photocatalysis efficiency of the photocatalyst film 6. The power device 4 has a power output end transmitting a power to a first end of the grip mechanism 5. A second end of the grip mechanism 5 is mechanically mounted with the light guide plate 1, so that the power device 4 can drive the light guide plate 1 to rotate. The first light source 8 is disposed in the grip mechanism 5 and faces to the light guide plate 1 so as to enable the light emitted from the first light source 8 to be coupled into the light guide plate 5 to activate the photocatalysis of the photocatalyst film 6.

The power output end of the power device 4 is a driver bearing 7, which is mechanically connected with the grip mechanism 5.

The groove structure of the light guide plate 1 can be replaced with a concavity or protrusion structure.

The photocatalyst film 6 is made of a material selected from a group consisting of titanium dioxide ($TiO_2$), silicon carbide (SiC), and gallium phosphide (GaP), which can be used as a photocatalyst in photocatalytic reduction reaction of carbon dioxide.

The first light source 8 may be any type of light source that can be embedded into the photocatalytic reactor. To improve the photocatalysis reaction, a light source with higher energy is needed. For example, titanium dioxide needs an ultraviolet light source or a blue ultraviolet light source to activate the photocatalysis.

According to the photocatalytic reactor of the present invention, upon a light beam from the first light source 8 is coupled into the light guide plate 1 along a first light coupling path 9, the light beam propagates inside the light guide plate 1 and irradiates the photocatalyst film 6 on the surface of the light guide plate 1 so as to activate the photocatalysis of the photocatalyst film 6. During the photocatalysis process, the surface of the light guide plate 1 will produce a pollutant fluid 2 that rotates along a rotation direction 3 of the light guide plate 1 driven by the power device 4.

Figure 3:
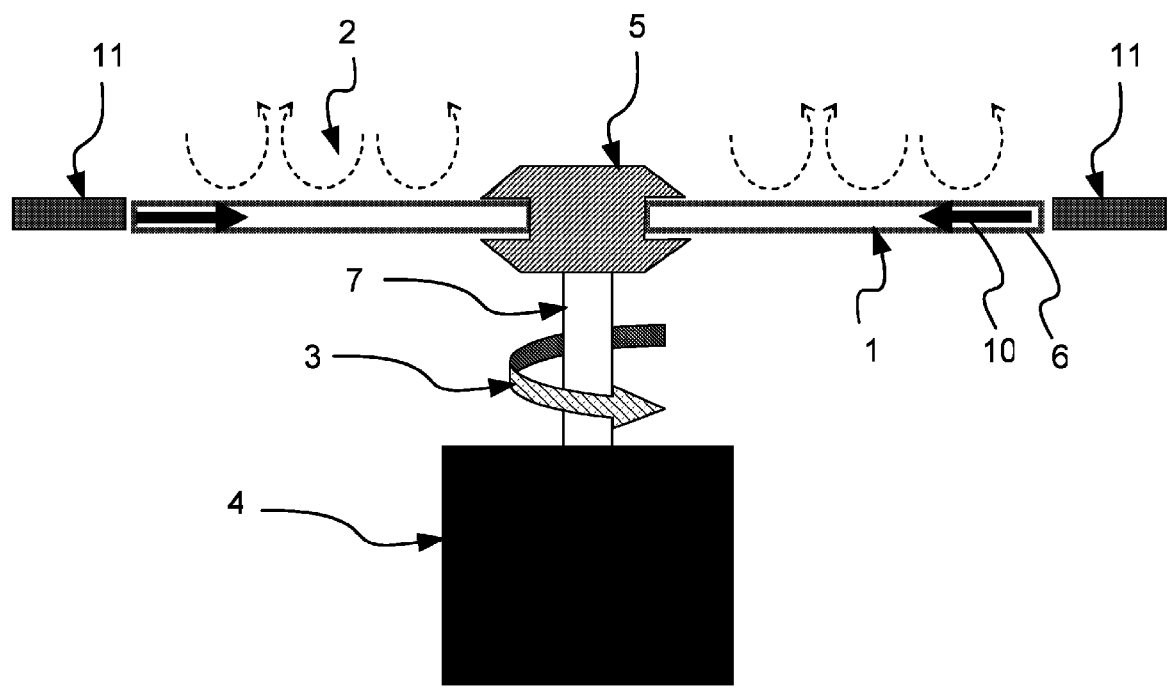
FIG. 3 is a schematic view showing the light coupling of the photocatalytic reactor according to a second embodiment of the present invention, in which the light source is fixedly disposed around a rim of the light guide plate.

Referring to FIG. 3, which shows the light coupling of the photocatalytic reactor according to a second embodiment of the present invention, a second light source 11 is fixedly disposed around a rim of the light guide plate 1. A light beam from the second light source 11 is coupled from the rim into the light guide plate 1 along a second light coupling path 10. In view that the second light source 11 is fixedly disposed at a reaction cavity of the photocatalytic reactor, it is convenient in operation and maintenance. The second light source 11 can be replaced without shutdown of the photocatalytic reactor. However, it has a lower light coupling efficiency; thereby it is needed to design an additional structure to improve its light coupling efficiency.

The light guide plate 1 may be designed to include an auxiliary light guide structure disposed at the center or the rim thereof, which corresponds to the first light source 8 or the second light source 11, respectively, to enhance the light coupling into the light guide plate 1.

Figure 4:
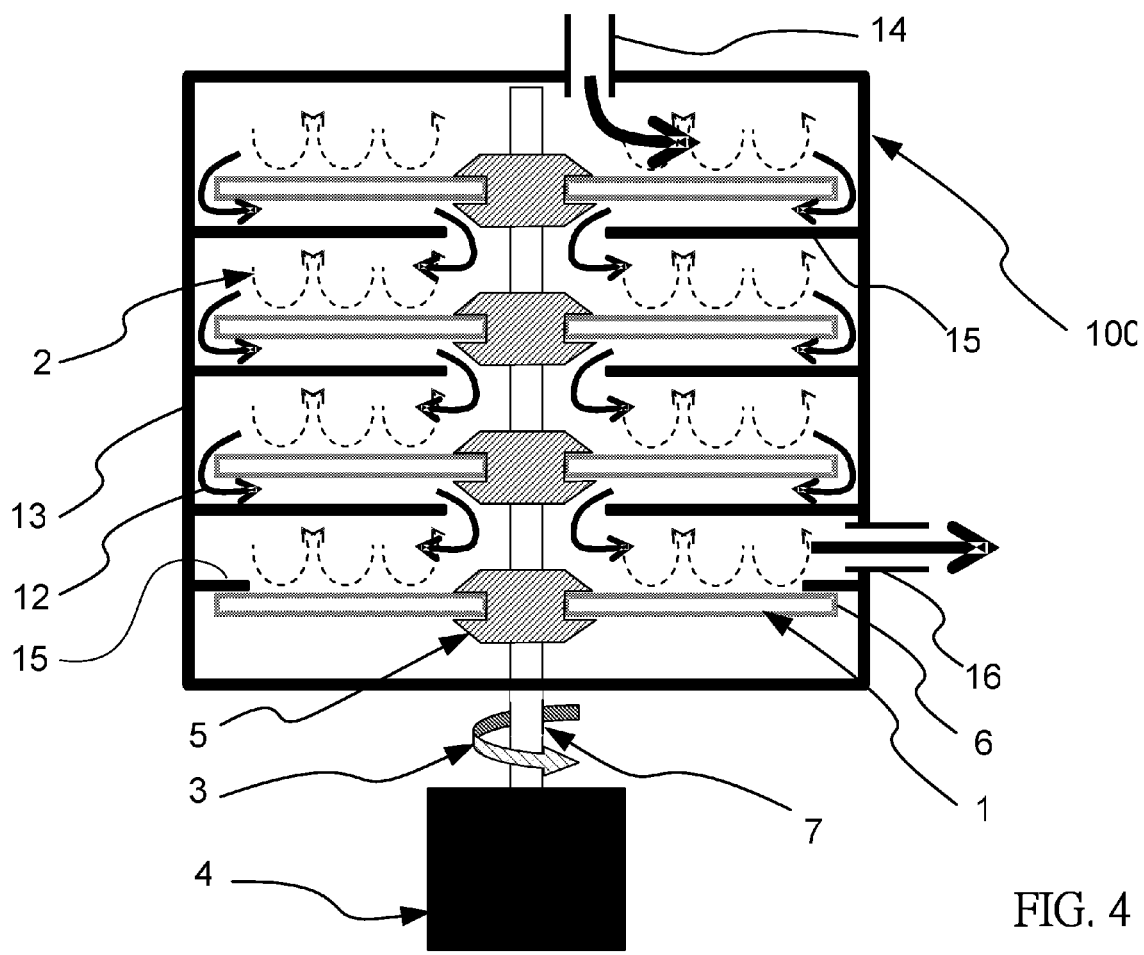
FIG. 4 is a schematic view showing that a plurality of light guide plates are assembled together in a stack type structure according to a third embodiment of the present invention.

Referring to FIG. 4, a photocatalytic reactor according to a third embodiment of the present invention includes a plurality of grip mechanisms 5 mounted at the driver bearing 7 of the power device 4, wherein each of the grip mechanisms 5 is mechanically mounted with a light guide plate 1. The photocatalytic reactor of the present invention further includes a flow guide device 100 that is a case structure. The light guide plates 1 are assembled together in a stack type structure and received in the flow guide device 100. That forms a reaction cavity of the photocatalytic reactor. The flow guide device 100 has an inlet 14, a plurality of partitions 15, and an outlet 16. The inlet 14 is an inflow passage of the reaction fluid, the outlet 16 is an outflow passage of the reacted fluid, and the partitions 15 separates the light guide plates 1 from each other.

The partitions 15 are arranged separately in an inner surface of the flow guide device 100 to form a plurality of spaces each receiving one light guide plate 1. The light guide plates 1 and the partitions 15 are configured to have a flow guide passage that connects between the inlet 14 and the outlet 16.

Figure 5:
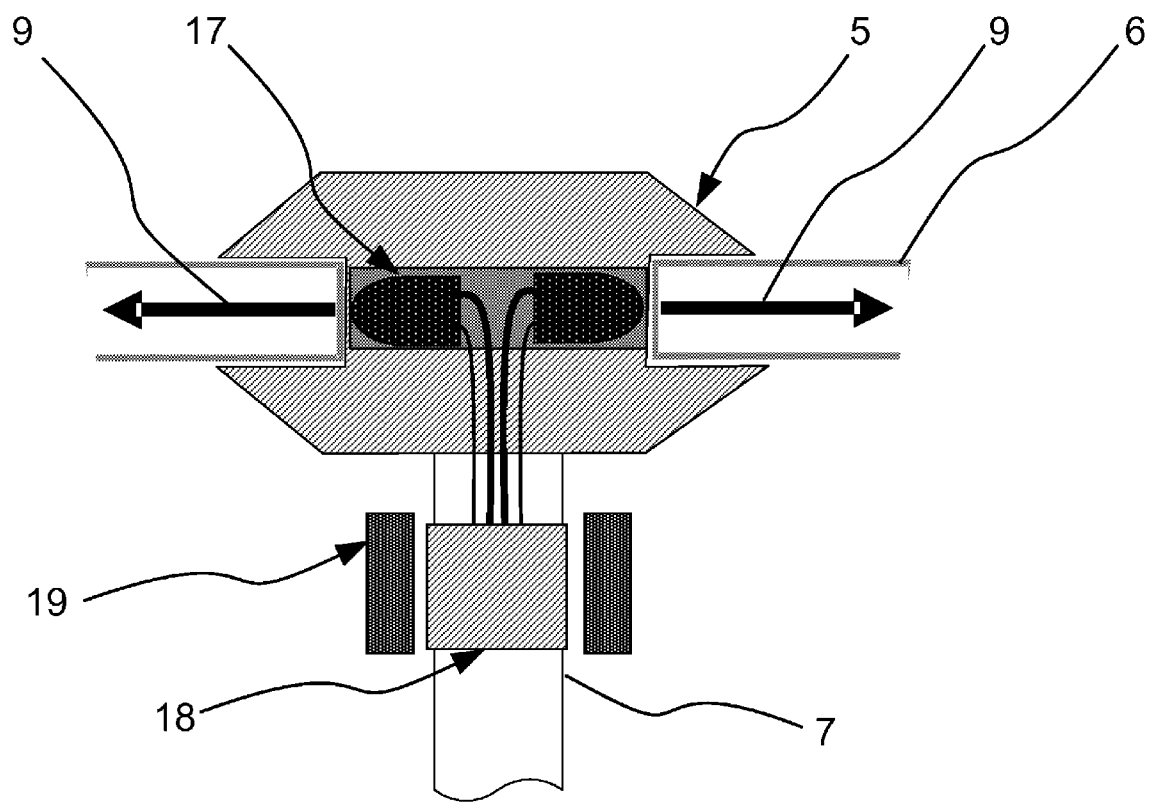
FIG. 5 is a schematic view showing a power supply of the photocatalytic reactor according to the first embodiment of the present invention.

Please refer to FIG. 5. In accordance with the first embodiment of the present invention, a plurality of small light sources, such as LED, are installed in the grip mechanism 5 of the photocatalytic reactor. The light beam from the small light sources can be directly coupled into the light guide plate 1. More precisely, the photocatalytic reactor of the present invention further includes at least an LED light source 17, an electromagnetic induction receiver 18 electrically connected to the LED light source 17, and an electromagnetic induction emitter 19, wherein the electromagnetic induction receiver 18 is installed at the driver bearing 7, and the electromagnetic induction emitter 19 is installed around but not in contact with the electromagnetic induction receiver 18. The electromagnetic induction emitter 19 is an electromagnetic field generation device, while the electromagnetic induction receiver 18 can transform the variation of the electromagnetic field into an electrical power output to the LED light source 17. Moreover, the LED light source 17 is installed in the grip mechanism 5 facing to the light guide plate 1 so as to enable the light beam from the LED light source 17 to be coupled into the light guide plate 1 to activate the photocatalysis reaction of the photocatalyst film 6.

Additionally, the LED light source 17 may be supplied with the electrical power by a brush type electricity generation device. That means the electromagnetic induction receiver 18 and the electromagnetic induction emitter 19 may be replaced with the brush type electricity generation device.

Figure 6:
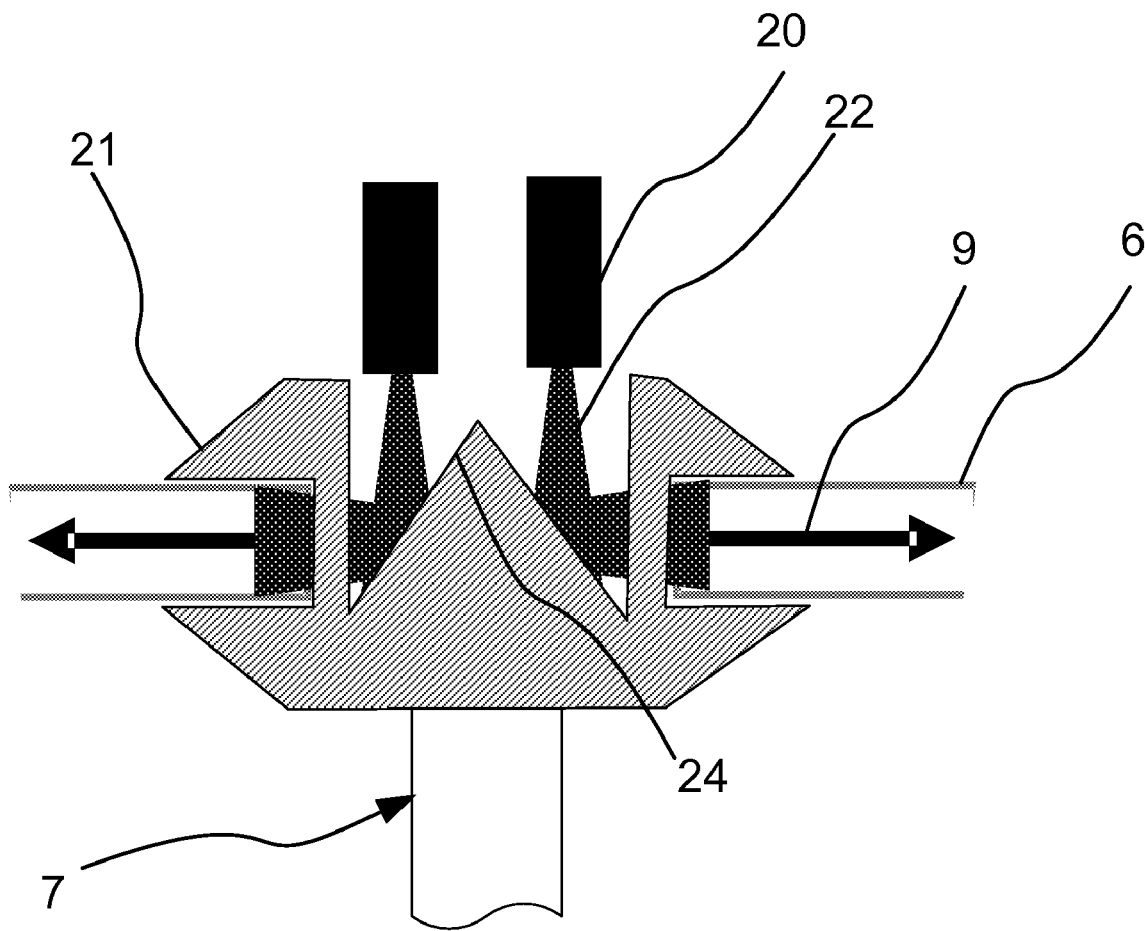
FIG. 6 is a schematic view showing the light coupling of the photocatalytic reactor according to a fourth embodiment of the present invention.

Please refer to FIG. 6, which shows the light coupling of the photocatalytic reactor according to a fourth embodiment of the present invention. The grip mechanism 5 and the LED light source 17 installed at the grip mechanism 5 are replaced with an optical coupling clamp 21 and a photocatalyst light source 20, respectively. The photocatalyst light source 20 is at least one external light source, while the optical clamp 21 comprises a plurality of reflective surfaces 24. Each of the reflective surfaces 24 reflects the light beam from the photocatalyst light source 20 along the first light coupling path 9 to be coupled into the light guide plate 1.

The photocatalyst light source 20 may be an LED light source or a fiber bundle light source.

In accordance with the present invention, the light guide plate 1 may be configured as any desired shape, not limited to circular shape. The light guide plate 1 may be designed to be not only rotation motion but also vibration motion, swing motion, or reciprocation motion to increase mass transfer and photocatalysis efficiency.

The light guide plate 1 is made of a single or mixed material that can be penetrated through by a light with a wavelength in the range from 300 to 800 nm.

The first light source 8, the second light source 11, or the LED light source 17 emits a light with a wide frequency band that can activate the photocatalysis reaction. Since the photocatalysis reaction shall be activated by a light with a specific range of wavelength, the light source should be suitably selected according to the characteristic of the photocatalyst film 6.

Figure 7:
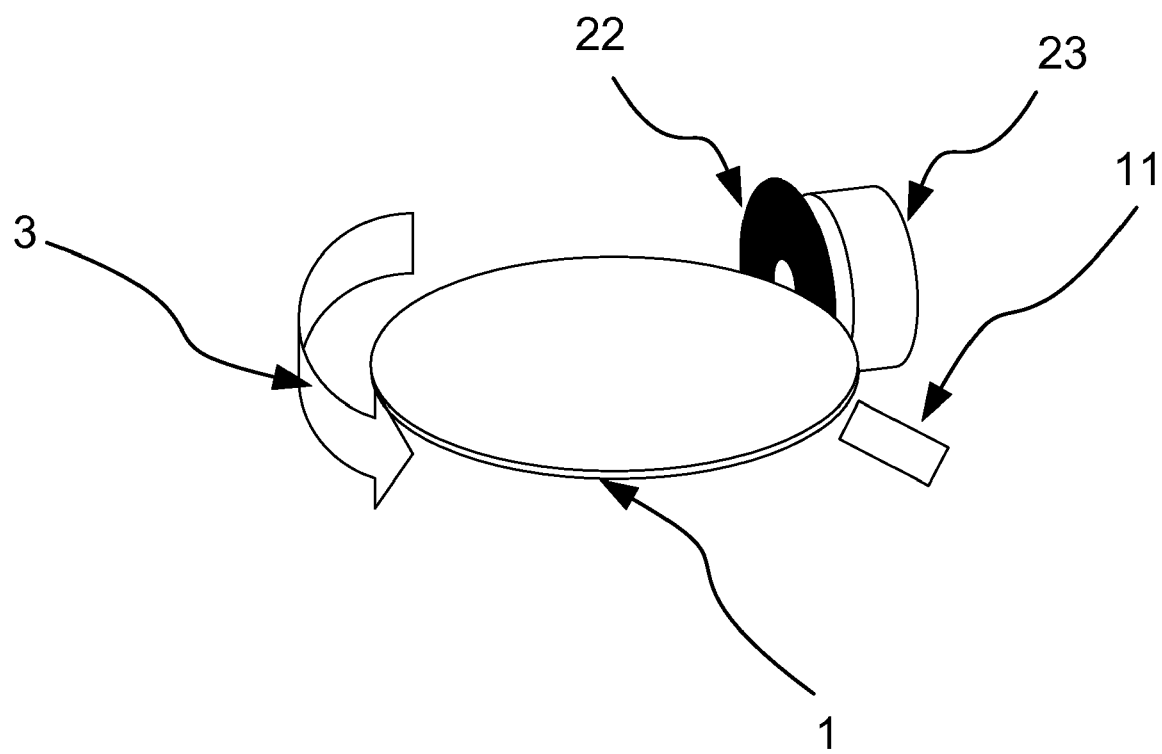
FIG. 7 is a schematic view showing an arrangement of the light source and an LED detector according to the second embodiment of the present invention.

Please refer to FIG. 7, which is a schematic view showing an arrangement of the light source and an LED detector according to the second embodiment of the present invention. The second light source 11 according to this embodiment emits a blue light with wave length 450 nm, and the light beam from the second light source 11 is coupled from the rim into the light guide plate 1. The light guide plate 1 driven by the power device 4 may reach to a rotational speed of about 4,200 rpm. As a result, the coupled light beam propagates inside the light guide plate 1 and then emits out of the rim of the light guide plate 1. The photocatalytic reactor of the present invention further includes a light limit device 22 and an LED detector 23 disposed at the rim of the light guide plate 1 for detecting the light beam emitting out of the light guide plate 1. The light limit device 22 is disposed in front of the LED detector 23, and the LED detector 23 must be disposed at a place where the LED detector 23 will not be affected by the second light source 11. Based on measurement results, when the rotational speed of the light guide plate 1 is lower than 4,200 rpm, the optical energy detected by the LED detector 23 is stable. That means the light guide plate 1 has a stable light coupling efficiency under high rotational speed. Therefore, after the light beam is coupled into the rotating light guide plate 1, the coupled light beam propagates inside the light guide plate 1, so as to activate the photocatalysis of the photocatalyst coated on the surface of the light guide plate 1. The photocatalysis will not be affected by the light transmittance of reactants, and the mass transfer efficiency of the reactants can be enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A photocatalytic reactor, comprising:
    a light guide plate coated with a photocatalyst film on a surface thereof, in which the light guide plate has a characteristic of light guide and the photocatalyst film is made of a material being capable of activating photocatalysis under light irradiation;
    a power device having a power output end;
    a grip mechanism having a first end and a second end, the first end being mounted with the power output end of the power device, the second end being mounted with the light guide plate; and
    a light source configured to emit a light beam for the activation of the photocatalyst film, the light source being disposed at a center of the light guide plate and in the grip mechanism, the light source facing to the light guide plate;
    wherein the light guide plate is rotatable by drive of the power device.

2. The photocatalytic reactor as claimed in claim 1, further comprising an electromagnetic induction receiver installed at a driver bearing of the power device and electrically connected to the light source, and an electromagnetic induction emitter is installed around the electromagnetic induction receiver; wherein the electromagnetic induction emitter generates an electromagnetic field, while the electromagnetic induction receiver transforms the variation of the electromagnetic field into an electrical power output to the light source.

3. The photocatalytic reactor as claimed in claim 2, wherein the light source comprises at least one light emitting diode (LED) light source.

4. The photocatalytic reactor as claimed in claim 1, wherein the power device is a rotation power device.

5. The photocatalytic reactor as claimed in claim 4, wherein the power output end of the power device is a driver bearing mechanically connected with the grip mechanism.

6. The photocatalytic reactor as claimed in claim 1, further comprising a plurality of light guide plates and a plurality of grip mechanisms each mounted with the corresponding light guide plate; and further comprising a flow guide device, which encloses the light guide plates, for guiding reaction fluid.

7. The photocatalytic reactor as claimed in claim 6, wherein the flow guide device is a case structure having an inlet for the input of the reaction fluid and an outlet for the output of the reacted fluid.

8. The photocatalytic reactor as claimed in claim 7, further comprising a plurality of partitions arranged separately in an inner surface of the flow guide device to form a plurality of spaces each receiving one of the light guide plates; wherein the light guide plates and the partitions are configured to have a flow guide passage that connects between the inlet and the outlet.

9. The photocatalytic reactor as claimed in claim 1, wherein the light guide plate is made of a material that is able to be penetrated through by a light with a wavelength in the range from 300 to 800 nm.

10. The photocatalytic reactor as claimed in claim 1, wherein the light guide plate has one of a groove structure, a concavity structure, and a protrusion structure on the surface thereof.

11. The photocatalytic reactor as claimed in claim 1, wherein the photocatalyst film is made of a material selected from a group consisting of titanium dioxide, silicon carbide and gallium phosphide.

12. The photocatalytic reactor as claimed in claim 1, wherein the light source is one of an ultraviolet light source and a blue ultraviolet light source.

13. The photocatalytic reactor as claimed in claim 1, wherein the light guide plate has a disk structure.

* * * * *